United States Patent [19]

Takahashi

[11] 4,336,220
[45] Jun. 22, 1982

[54] METHOD OF AND APPARATUS FOR MANUFACTURING A CONTINUOUS SLIDE FASTENER STRINGER

[75] Inventor: Kihei Takahashi, Uozu, Japan
[73] Assignee: Yoshida Kogyo K.K., Tokyo, Japan
[21] Appl. No.: 190,979
[22] Filed: Sep. 26, 1980
[30] Foreign Application Priority Data Oct. 1, 1979 [JP] Japan ............................ 54-125345

[51] Int. Cl.³ .......................................... B29D 5/00
[52] U.S. Cl. ................................. 264/229; 264/252; 264/288.8; 264/291; 425/111; 425/112; 425/116; 425/126 R; 425/383; 425/814
[58] Field of Search ............ 264/252, 291, 229, 288.8; 425/111, 112, 116, 121, 126 R, 383, 814

[56] References Cited

U.S. PATENT DOCUMENTS

| | | | |
|---|---|---|---|
| 2,735,139 | 2/1956 | Morin | 18/59 |
| 3,178,772 | 4/1965 | Morin | 264/252 |
| 4,044,431 | 8/1977 | Moestel | 264/281 |
| 4,226,577 | 10/1980 | Sawada | 425/814 |
| 4,259,272 | 3/1981 | MacFee | 264/23 |

Primary Examiner—James B. Lowe
Attorney, Agent, or Firm—Hill, Van Santen, Steadman, Chiara & Simpson

[57] ABSTRACT

A method of manufacturing a continuous slide fastener stringer, comprising the steps of: providing a continuous stringer tape having a plurality of openings along a longitudinal edge thereof at regular intervals of a first distance d; then placing a part of the tape between a pair of mold members defining a number of mold cavities spaced at regular intervals of a second distance D slightly greater than the first distance d; then stretching the part of the tape until the openings in that part are aligned with the mold cavities; then injecting melted synthetic resin material into mold cavities, while the mold members are closed, to form on the part of the tape of number of the injection-molded coupling elements one at each of the openings; and repeating the preceding steps, except the first-mentioned step, for a succeeding part of the tape. An apparatus for carrying out the method includes a frame having the mold members, and stringer tape advancing means, such means effecting suitable stretching of the part of the tape between the mold members so as to align the tape openings with the mold cavities.

12 Claims, 9 Drawing Figures

METHOD OF AND APPARATUS FOR MANUFACTURING A CONTINUOUS SLIDE FASTENER STRINGER

BACKGROUND OF THE INVENTION

1. Field of the Invention

The present invention relates to a method of and apparatus for manufacturing a continuous slide fastener stringer including a stringer tape and a row of injection-molded coupling elements secured to the stringer tape along a longitudinal edge thereof.

2. Prior Art

U.S. Pat. No. 2,735,139, issued Feb. 21, 1956, discloses a method of securing a row of injection-molded coupling elements to a stringer tape by means of a pair of relatively movable mold halves having a plurality of mold cavities. In the method a plurality of openings are formed in the stringer tape along a longitudinal edge thereof and, substantially at the same time, melted (synthetic resin) material is injected into the mold cavities to form the coupling elements on the tape one at each of the openings. This requires that a plurality of piercing devices should be built in the mold, one at each of the mold cavities, making the mold extremely complicated. For this reason, the prior method has scarcely been available in practice for the production of a substantially endless or continuous slide fastener stringer.

Japanese Patent Publication (Tokkosho) Nos. 38-4771 and 53-28309 show respectively a method of and an apparatus for manufacturing a continuous slide fastener stringer including a continuous stringer tape and a row of injection-molded coupling elements secured to the stringer tape. However, this prior method and apparatus are not useful in that the stringer tape has a plurality of openings along the longitudinal edge thereof for preventing the coupling elements from being displaced on the tape. With such prior art it is difficult to form the individual coupling elements exactly at the corresponding openings.

SUMMARY OF THE INVENTION

An object of the present invention is to provide a method of and an apparatus for securing a row of injection-molded coupling elements to a continuous slide fastener stringer tape having a plurality of openings along a longitudinal edge thereof, by which the coupling elements can be formed exactly at the openings.

According to the present invention, a method of manufacturing a continuous slide fastener stringer comprises the steps of: providing a continuous stringer tape having a plurality of openings spaced at regular intervals of a first distance along a longitudinal edge of the stringer tape; then placing a part of the stringer tape between a pair of relatively movable mold members defining a predetermined number of mold cavities spaced at regular intervals of a second distance slightly greater than the first distance; then stretching the part of the stringer tape until the openings therein are aligned with the mold cavities in the mold members; then injecting melted synthetic resin material into mold cavities, while the mold members are closed, to form on the part of the stringer tape the coupling elements, one at each of the openings; and repeating the preceding steps except the first-mentioned step for a succeeding part of the stringer tape.

An apparatus for carrying out the method has means disposed upstream of the mold members for stretching one of successive parts of the stringer tape, while a leading end of that tape part is held in position by the half-closed mold members, until the openings in the same part are aligned with the mold cavities. The stretching means includes a pilot wheel rotatably supported on a frame and having a number of peripheral teeth engageable with the openings of the stringer tape, and means for turning the pilot wheel in the reverse direction through a predetermined angle while the leading end of the said part of the stringer tape is held in position.

Many other advantages, features and additional objects of the present invention will become manifest to those versed in the art upon making reference to the detailed description and the accompanying drawings in which preferred embodiments incorporating the principles of the present invention are shown by way of example.

DETAILED DESCRIPTION OF THE PREFERRED EMBODIMENTS

Figure 1:
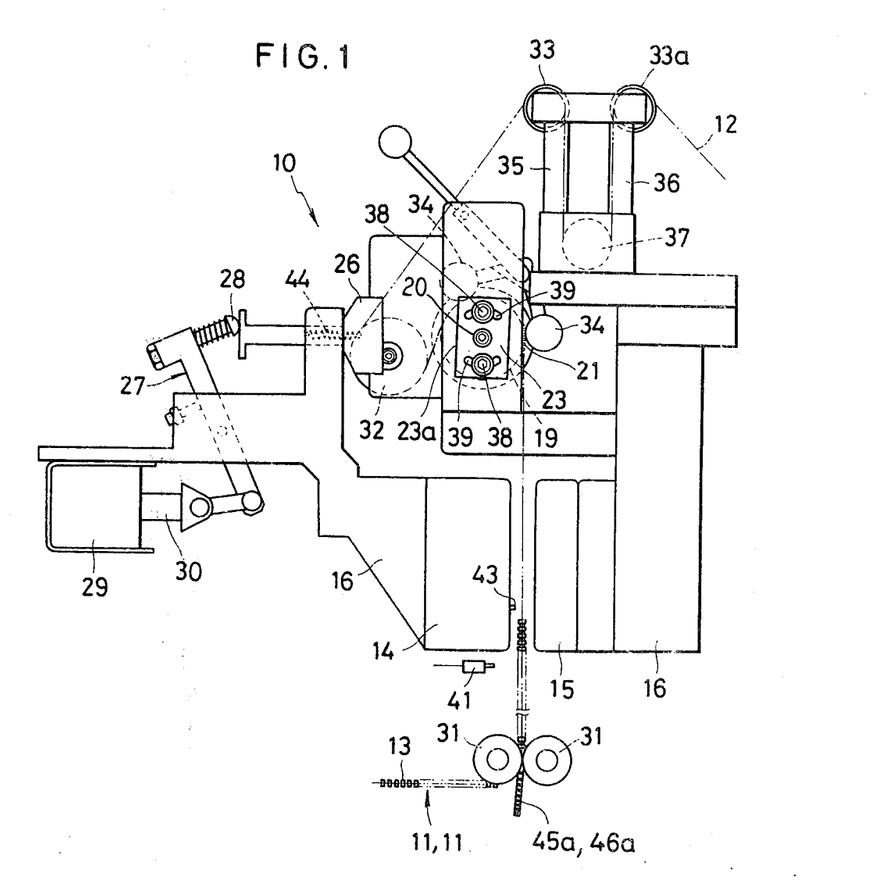
FIG. 1 is a front elevational view of an apparatus embodying the present invention.
Figure 2:
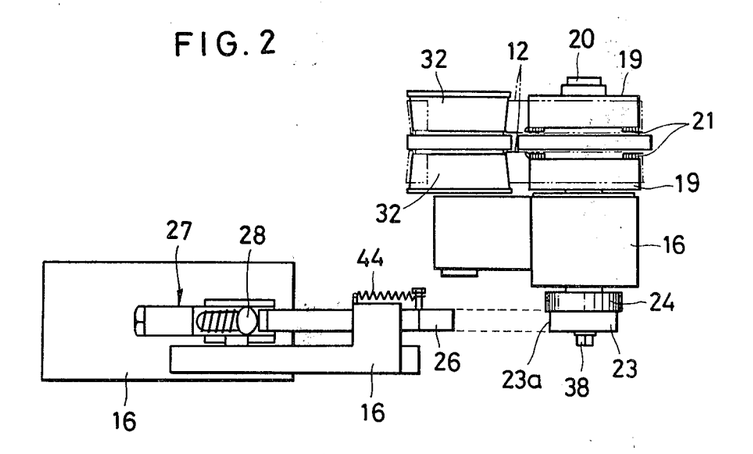
FIG. 2 is a plan view of the apparatus of FIG. 1 with parts omitted.

FIGS. 1 and 2 show an apparatus 10 for manufacturing a pair of substantially endless or continuous slide fastener stringers 11,11 (only one of which is described here for clarity) each including a stringer tape 12 and a row of injection-molded coupling elements 13 secured to the stringer tape 12 along a longitudinal edge thereof. The stringer tape 12 has been beforehand provided with a plurality of openings 18 (FIGS. 3 and 4) along the longitudinal edge thereof at regular intervals of a first distance d (FIG. 4).

Figure 3:
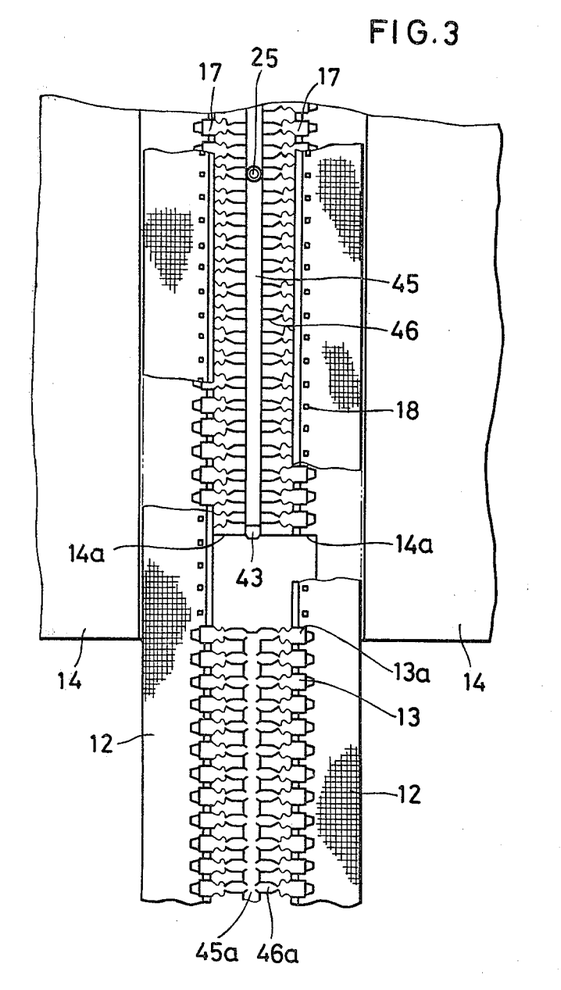
FIG. 3 is an enlarged fragmentary view of a stationary mold member with a pair of slide fastener stringers, showing the manner in which a pair of rows of injection-molded coupling elements are formed on a pair of stringer tapes along their respective inner longitudinal edges.
Figure 4:
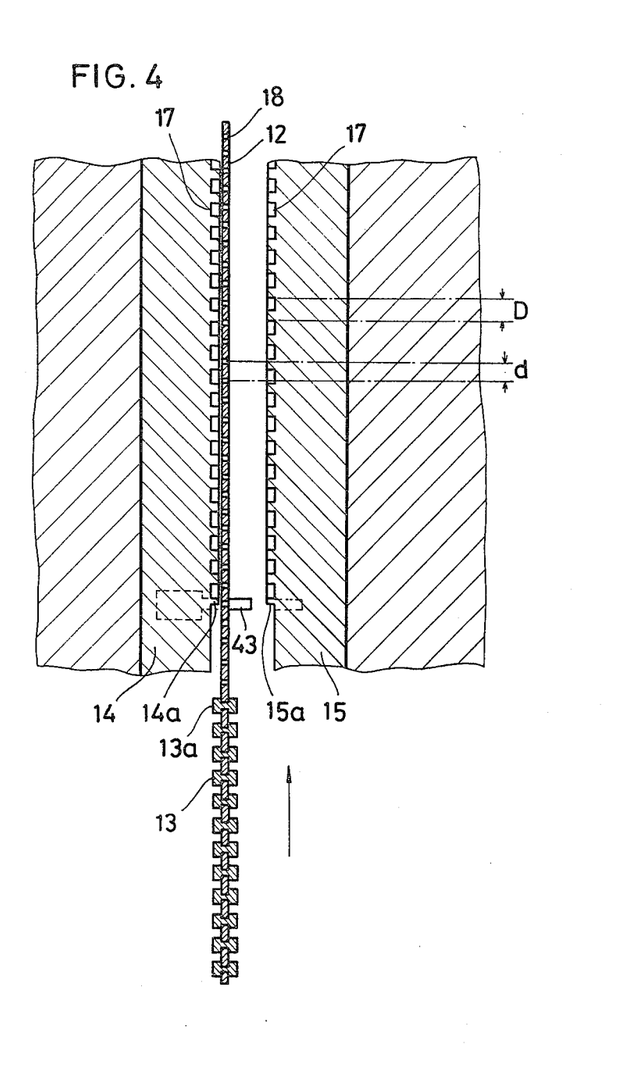
FIG. 4 is an enlarged, fragmentary cross-sectional view of the stationary mold member and a movable mold member.

The apparatus 10 comprises a pair of relatively movable mold halves or members 14,15 (hereinafter referred to as "mold members") supported on a frame 16 and defining a predetermined number of mold cavities 17 (FIGS. 3 and 4), means (described below) disposed upstream and downstream of the mold members 14,15 for intermittently advancing successive parts of the stringer tape 12 through the mold members 14,15, and an injector (only a nozzle 25 of which is shown in FIG. 3) for injecting melted synthetic resin material into the mold cavities 17, while the mold members 14,15 are fully closed as described below. The mold cavities 17 are spaced at regular intervals of a second distance D (FIG. 4) slightly greater than the first distance d, and each of the mold cavities 17 has a contour corresponding to the shape of a single coupling element 13.

The first mold member 14 is fixed on the frame 16. The second mold member 15 is movable, toward and away from the first mold member 14, between a first position (FIG. 5) in which the mold members 14,15 are fully opened for the passage therethrough of the stringer tape 12, a second position (indicated in phantom lines in FIG. 6) in which the mold members 14,15 are half closed to hold a leading end of one of successive parts of the stringer tape 12, and a third position (FIG. 7) in which the mold members 14,15 are fully closed to hold throughout its length the said one of successive parts of the stringer tape 12.

Figure 6:
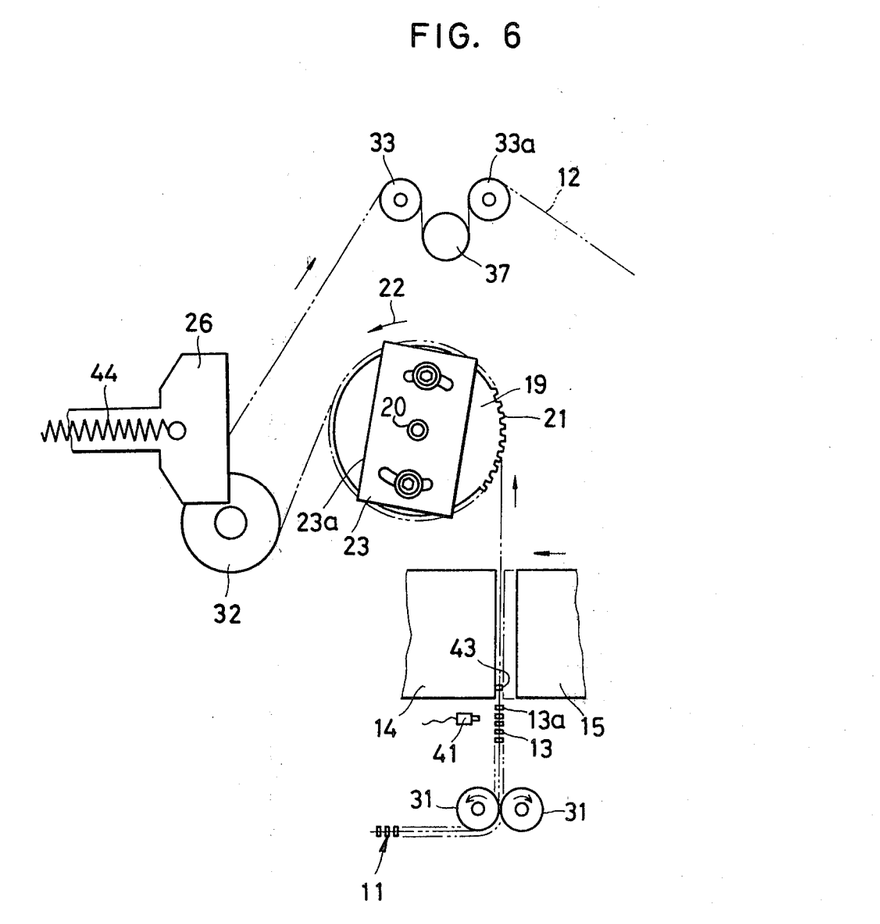
Figure 7:
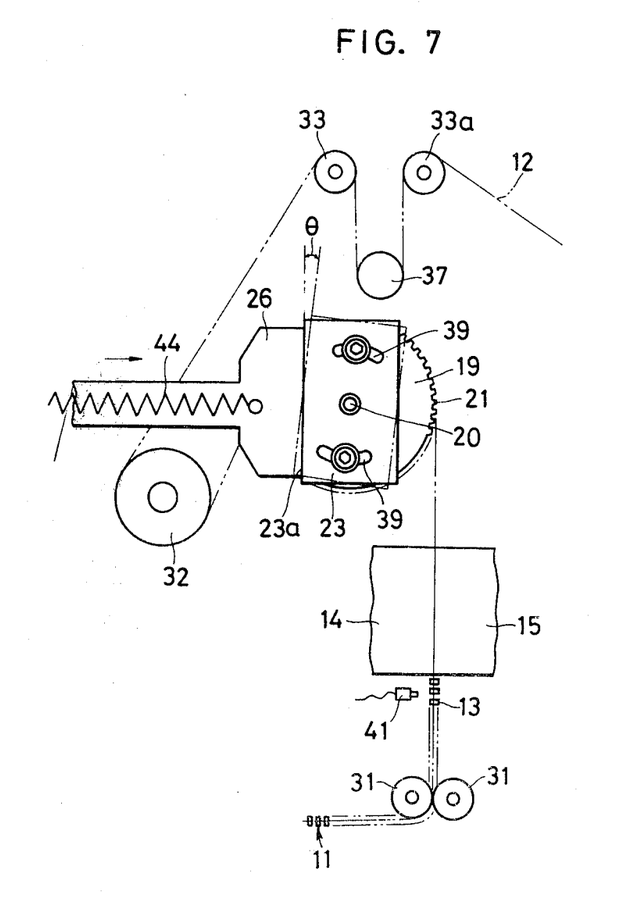

The apparatus 10 further comprises means disposed upstream of the mold members 14,15 for stretching one of the successive parts of the stringer tape 12, while the mold members 14,15 are half closed, i.e. in the second position (phantom lines in FIG. 6), until the openings 18 in that part of the stringer tape 12 are aligned with the mold cavities 17. The stretching means includes a pilot wheel 19 mounted on a shaft 20 supported on the frame 16 and having a number of peripheral teeth 21 engageable with the openings 18 in the stringer tape 12 and means for turning the pilot wheel 19 in the reverse direction (indicated by an arrow 22 in FIG. 6) through a predetermined angle $\theta$ (FIG. 7) while the mold members 14,15 are half closed. The last-mentioned means includes a rectangular plate 23 supported on a circular plate 24 (FIG. 2) mounted on the shaft 20 coaxially of the pilot wheel 19, and a push member 26 for pushing the rectangular plate 23 so as to angularly move the same about the shaft 20 through the angle $\theta$ (FIG. 7).

The push member 26 is slidably supported on the frame 16 and is movable toward and away from the rectangular plate 23 in response to pivotal movement of a hammer member 27 (FIG. 1). The hammer member 27 is pivotably supported on the frame 16 and has a hammer head 28 on one end. The other end of the hammer member 27 is operatively connected to a solenoid 29. The push member 26 is normally urged by a spring 44 toward the left (as viewed in the drawings). When the solenoid 29 is energized as described below, a plunger 30 is retracted to angularly move the hammer member 27 clockwise (FIG. 1). The hammer head 28 then strikes the push member 26 on its left side end to move the push member 26 from the position of FIGS. 1, 5 and 6 to the position of FIG. 7.

The stringer-type advancing means includes a pair of feed rolls 31,31 disposed downstream of the mold members 14,15 for feeding the stringer tape 12, and tensioning means disposed upstream of the mold members 14,15 for supplying the stringer tape 12 with a constant tension up to the pilot wheel 19 via a guide roll 32. A pair of pinch rolls 34 press the stringer tape 12 against the periphery of the pilot wheel 19. the tensioning means includes a pair of horizontally spaced guide rolls 33,33a rotatable on a pair of supports 35,36, respectively, and a tension roll 37 rollable on the stringer tape 12 hung on and between the guide rolls 33,33a. The tension roll 37 is thus movable between a raised position (FIG. 6) and a lowered position (FIGS. 1, 5 and 7), keeping the tension of the stringer tape 12 constant between a cheese or spool (not shown) and the pilot wheel 19.

The number, y, of the teeth 21 on the pilot wheel 19 is equal to 2/n, (n represents a natural number) times the number, x, of the mold cavities 17 in the mold members 14,15; that is to say, $y = 2/n \cdot x$.

The rectangular plate 23 is mounted on the circular plate 24 (FIG. 2) by means of a pair of bolts 38,38 such that, at the time when one of successive parts of the stringer tape 12 is properly placed between the first and second mold members 14,15 ready to be stretched, the longer side edges 23a (FIGS. 5 to 7) of the rectangular plate 23 are angularly oriented by the predetermined angle ($\theta$) from the vertical. The rectangular plate 23 has a pair of concentric arcuate slots 39,39, through which the bolts 38,38 respectively extend, so that the angular orientation of the rectangular plate 23 can be adjusted if the bolts 38,38 are loosened.

Figure 5:
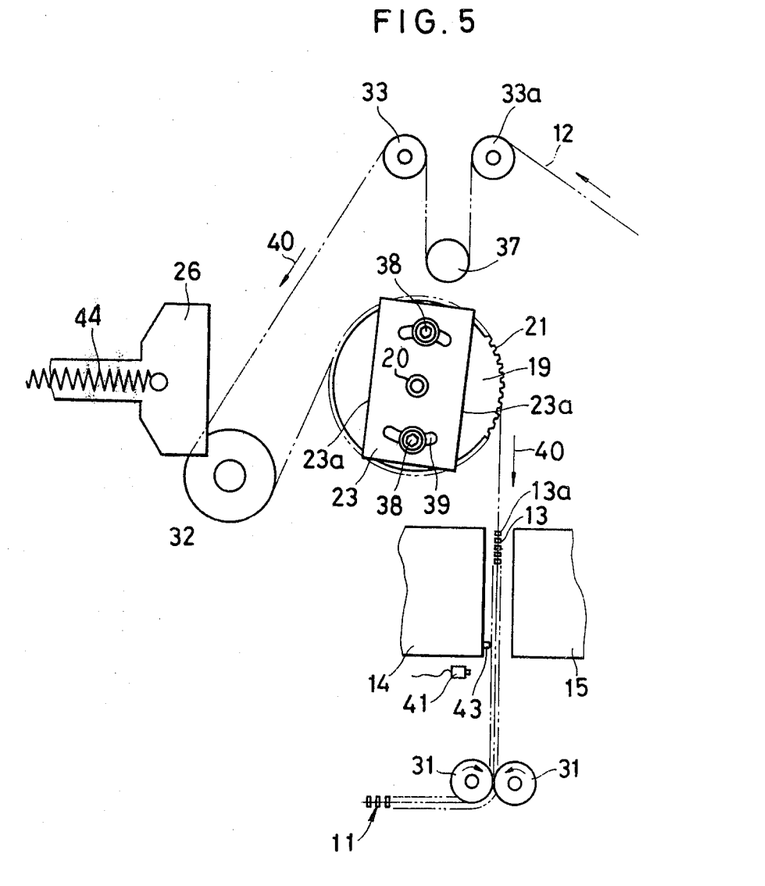
FIGS. 5 to 7 are front elevational views of main parts of the apparatus, showing various steps of the method according to the present invention.

The apparatus 10 operates as follows. A substantially endless or continuous length of the stringer tape 12 has been beforehand provided with a plurality of the openings 18 along the longitudinal edge thereof at regular intervals of the first distance d (FIG. 4) slightly shorter than the second distance D between the adjacent mold cavities 17. In FIG. 5, the stringer tape 12 is being fed in the direction of arrows 40 by the feed rolls 31,31, while the supply of the stringer tape 12 from the non-illustrated cheese or spool is stopped. At that time, the tension roll 37 is moved upwardly. When a photoelectric detecting device 41 (FIG. 1) detects a trailing end 13a (FIG. 4) of the previous injection-molded coupling elements 13, the feeding of the stringer tape 12 by the feed rolls 31,31 is stopped. The second mold member then moves from the first or fully opened position (FIG. 5) to the second or half-closed position (phantom lines in FIG. 6). Simultaneously, the feed rolls 31,31 are reversely driven to feed the stringer tape 12 in the direction of the arrow 22 (FIG. 6), during the time of which the tension roll 37 is lowered. This reverse feeding of the stringer tape 12 by the feed rolls 31,31 is stopped as the trailing end 13a of the injection-molded coupling elements 13 is detected by a feeler 43. At this time, the trailing end coupling element 13a is held against further travel by the first and second mold members 14,15 at their recessed portions 14a,15a (FIG. 4). Thus one of successive parts of the stringer tape 12 is placed properly between the mold members 14,15, ready to be stretched. Then the solenoid 29 is energized to retract the plunger 30 leftwardly, causing the hammer member 27 to pivot clockwise (FIG. 1) to force the push member 26 from the position of FIGS. 1, 5 and 6 to the position of FIG. 7 against the bias of the spring 44. The rectangular plate 23 is thereby angularly moved about the shaft 20 through the angle $\theta$ from the oriented position (phantom lines) to the vertical position (solid lines) in FIG. 7; that is, the pilot wheel 19 is turned counterclockwise through the same angle $\theta$, stretching the said one of successive parts of the stringer tape 12 by a length corresponding to such displacement on the circumference of the pilot wheel 19. As a result, the openings 18 in that part of the stringer tape 12 are aligned with the mold cavities 17 in the mold members 14,15.

With the part of the stringer tape 12 stretched, the second mold member 15 is moved to the fully closed or third position (FIG. 7) and then melted synthetic resin material is injected into the mold cavities 17, through the nozzle 25, a runner 45 and gates 46 (FIG. 3), to form a predetermined number of the coupling elements 13 on the same part of the stringer tape 12 one at each of the openings 18 exactly. Then the solenoid 29 is de-energized to retract the hammer head 28. The push member 26 returns to its original position (FIGS. 1, 5 and 6).

After the injection-molded coupling elements 13 have been cooled, the second mold member 15 is moved from the fully closed or third position (FIG. 7) to the fully opened or first position (FIG. 5), at which time the injection-molded coupling elements 13 are ejected out of the mold cavities 17 by means of a plurality of ejector pins (not shown). Then a length of the stringer tape 12 is released from the non-illustrated cheese or spool and hence the tension roll 37 is lowered by its own weight.

Simultaneously with the ejecting of the injection-molded coupling elements 13, the feed rolls 31,31 are driven to feed the stringer tape 12 in the direction of the arrows 40 (FIG. 5). The runner 45a and gates 46b (FIG. 3) are removed as the stringer tape 12 passes through between the two feed rolls 31,31, as shown in FIG. 1. Thus, one cycle of operation for one of successive parts of the stringer tape 12 has been completed. The same operation is repeated for a succeeding part of the stringer tape 12.

Figure 8:
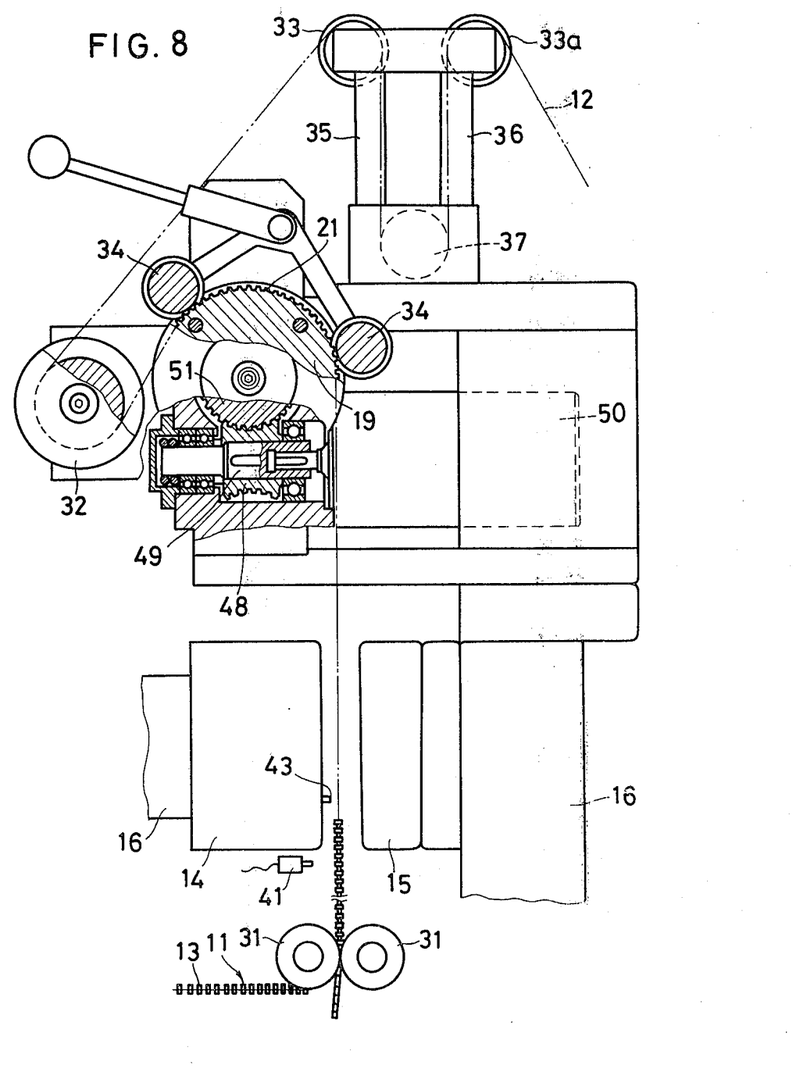
FIG. 8 is a front elevational view, with parts broken away of a modified apparatus.
Figure 9:
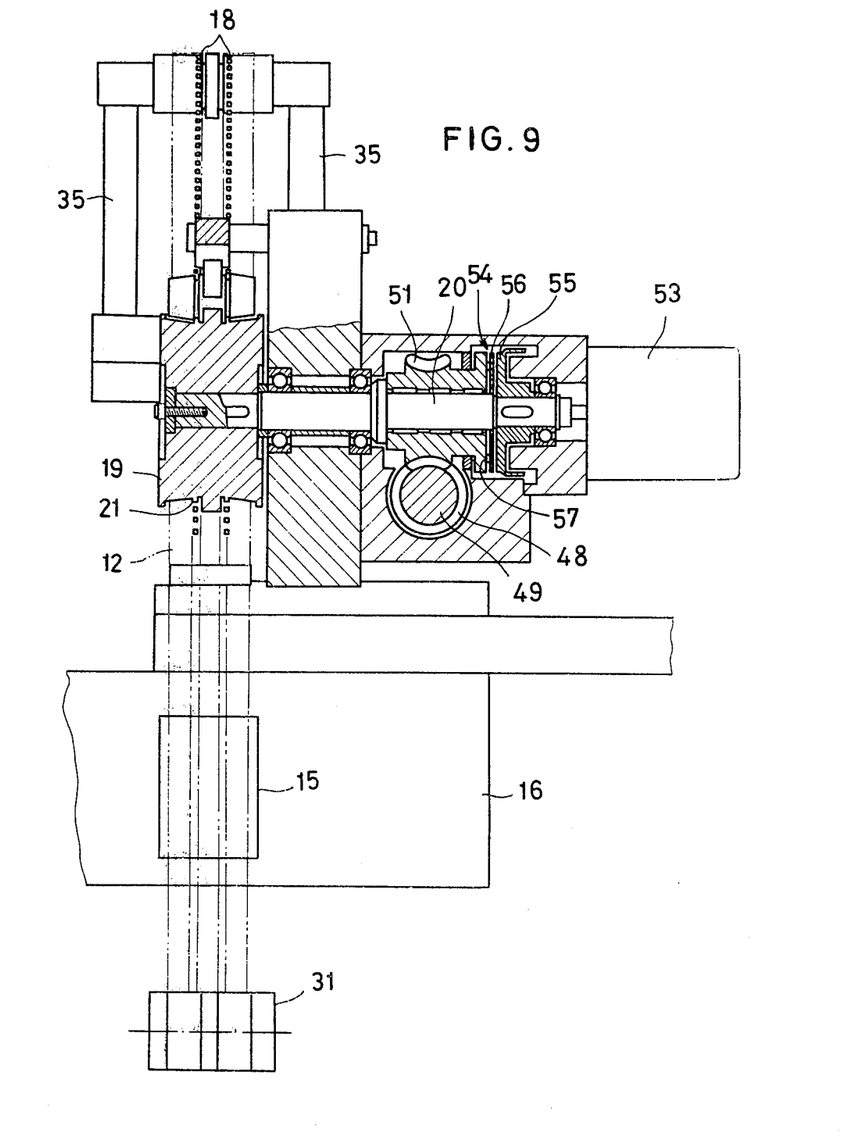
FIG. 9 is a left side elevational view, with parts broken away, of the apparatus of FIG. 8.

FIGS. 8 and 9 show a second embodiment of the means for turning the pilot wheel 19 in the reverse direction through the predetermined angle $\theta$, while the mold members 14,15 are half closed.

The shaft 20 rotatably supported on the frame 16 has an extension projecting remotely from the pilot wheel 19 and coupled at its distal end with a shaft of a pulse encoder 53 for measuring and storing the angular movement of the shaft 20. Arranged on the extension between the pilot wheel 19 and the pulse encoder 53 are a worm gear 51 rotatably mounted on the shaft extension and an electric clutch 54 comprising a drive or clutch plate 55 with an electromagnet (not shown) secured to the shaft extension and a driven plate or armature 56 corotatably connected by pins 57 to the worm gear 51 and adapted to be brought into engagement with the clutch plate 55 upon actuation. The worm gear 51 is driven by a worm 48 mounted on a drive shaft 49 of an electric motor 50 supported on the frame 16, the electric motor 50 being electrically connected to the pulse encoder 53 which generates signal pulses, based on a program preset therein to control the operation of the electric motor.

In operation, the stringer tapes 12 are advanced by the feed rolls 31,31, during the time of which the angular movement of the pilot wheel 19 is measured by and stored in the pulse encoder 53. Simultaneously, the electric motor 50 is driven to rotate the worm gear 51 in the direction opposite to that of the pilot wheel 19. At that time, however, the electric clutch 54 is de-energized so that the worm gear 51 continues to rotate independently of the rotation of the pilot wheel 19 and the shaft 20. When the photoelectric detecting device 41 detects a trailing end 13a (FIG. 4) of the previous injection-molded coupling elements 13, the feed rolls 31,31 cease to advance the stringer tapes 12. After the second mold member 15 moved to the half-closed position (phantom line in FIG. 6), the electric clutch 54 is energized to bring the armature 56 into engagement with the clutch plate 55, enabling the electric motor 50 to rotate the pilot wheel 19 in the reverse direction through driving engagement of the worm 48 with the worm gear 51. Simultaneously, the feed rolls 31,31 are reversely driven to feed the stringer tapes 12,12 in the direction of the arrow 22 (FIG. 6). Upon detection of the trailing end 13a of the injection-molded coupling elements 13 by the feeler 43, the reverse feeding of the stringer tapes 12 by the feed rolls 31,31 is stopped whereas the electric clutch 54 remains energized so as to continuously rotate the pilot wheel 19 in the reverse direction. When the angular movement measured by the pulse encoder 53 reaches a predetermined value preset in the pulse encoder 53, the pulse encoder 53 generate an electric signal to stop the rotation of the electric motor 50. The predetermined value is so set as to bring the openings 18 in the part of the stringer tape 12 into alignment with the mold cavities 17 in the mold members 14,15.

With this condition, the second mold member 15 moves to the fully closed position, and then melted synthetic resin material is injected into the mold cavities 17 to form a predetermined number of the coupling elements 13. After the injection-molded coupling elements 13 have been cooled, the second mold member 15 is moved to the fully opened position (FIG. 5), at which time the injection-molded coupling elements 13 are ejected out of the mold cavities 17 by means of a plurality of ejector pins (not shown). Simultaneously with the ejection of the injection-molded coupling elements 13, the electric clutch 54 is de-energized.

Although various minor modifications may be suggested by those versed in the art, it should be understood that I wish to embody within the scope of the patent warranted hereon, all such embodiments as reasonably and properly come within the scope of my contribution to the art.

What is claimed is:

1. A method of manufacturing a continuous slide fastener stringer including a continuous stringer tape and a row of injection-molded coupling elements secured to the stringer tape along a longitudinal edge thereof, said method comprising the steps of:
    (a) providing a stringer tape having a plurality of openings in the stringer tape along the longitudinal edge thereof at regular intervals of a first distance;
    (b) then placing a part of the stringer tape between a pair of relatively movable mold members defining a predetermined number of mold cavities spaced at regular intervals of a second distance slightly greater than said first distance;
    (c) then stretching said part of the stringer tape until the openings therein are aligned with the mold cavities in the mold members;
    (d) then injecting melted synthetic resin material into the mold cavities, while the mold members are closed with the openings in said part of the stringer tape aligned with the mold cavities of the mold members, to form on said part of the stringer tape the coupling elements, one at each of the openings; and
    (e) repeating the preceding steps (b), (c) and (d) for a succeeding part of the stringer tape.

2. A method according to claim 1, in which said stringer tape stretching step is performed while only a leading end of said part of the stringer tape is held in position by the mold members.

3. An apparatus for manufacturing a continuous slide fastener stringer including a continuous stringer tape and a row of injection-molded coupling elements secured to the stringer tape along a longitudinal edge thereof, the stringer tape having a plurality of openings along the longitudinal edge thereof at regular intervals of a first distance, said apparatus comprising:
    (a) a frame;
    (b) a pair of relatively movable mold members supported on said frame and defining a predetermined number of mold cavities spaced at regular intervals of a second distance slightly greater than said first distance, said mold members being movable relatively to each other between a first position in which said mold members are fully opened for the passage therethrough of the stringer tape, a second position in which said mold members are half closed to hold only one end of one of the successive parts of the stringer tape, and a third position in which said mold members are fully closed to hold throughout its length said one of the successive parts of the stringer tape;

(c) means supported on said frame both upstream and downstream of said mold members for intermittently advancing tape through said mold members;

(d) means supported on said frame to engage the other end of said one of the successive parts of the stringer tape for stretching said one of the successive parts of the stringer tape, while said mold members are in said second position, until said openings in said one of the successive parts of the stringer tape are aligned with said mold cavities; and (e) means associated with said mold members for injecting melted synthetic resin material into said mold cavities, while said mold members are in said third position, to form on said one of the successive parts of the stringer tape the coupling elements, one at each of the openings.

4. An apparatus according to claim 3, said stretching means including:
(a) a pilot wheel rotatably supported on said frame and having a number of peripheral teeth engageable with the openings in the stringer tape; and
(b) means for turning said pilot wheel in the reverse direction through a predetermined angle while said mold members are in said second position.

5. An apparatus according to claim 4, the lastnamed means including:
(a) a plate connected to said pilot wheel coaxially and corotatably therewith; and
(b) a push member supported on said frame and movable toward and away from said plate for pushing said plate so as to angularly move the same through said predetermined angle.

6. An apparatus according to claim 5, in which said plate is angularly adjustably connected to said pilot wheel.

7. An apparatus according to claim 4, the lastnamed means including:
(a) means for reversely driving said pilot wheel for rotation;
(b) a clutch for operatively connecting and disconnecting said drive means and said pilot wheel; and
(c) means for controlling the operation of said driving means.

8. An apparatus according to claim 7, said driving means including an electric motor, a first gear mounted on a driving shaft of said electric motor, and a second gear coaxially mounted on said pilot wheel, said first and second gears being brought into and out of driving engagement with said pilot wheel by said clutch.

9. According to claim 8, said first and second gears comprising a worm and a worm gear meshing each other.

10. An apparatus according to claim 7, said controlling means including a pulse encoder for generating signal pulses, based on a program preset in said encoder, to control the operation of said driving means.

11. An apparatus according to claim 3, said stringer-tape advancing means including:
(a) means disposed upstream of said pilot wheel for supplying thereto the stringer tape with a constant tension; and
(b) a pair of feed rolls disposed downstream of said mold members for intermittently feeding the successive parts of the stringer tape.

12. An apparatus according to claim 11, the last-named means including a pair of horizontally spaced guide rolls rotatably supported on said frame and a tension roll adapted to be vertically movably carried on the stringer tape hung on and between said guide rolls.

* * * * *